(12) United States Patent
Holt

(10) Patent No.: US 9,365,246 B1
(45) Date of Patent: Jun. 14, 2016

(54) RAILING KIT FOR A UTILITY CART

(71) Applicant: David Holt, Azle, TX (US)

(72) Inventor: David Holt, Azle, TX (US)

( * ) Notice: Subject to any disclaimer, the term of this patent is extended or adjusted under 35 U.S.C. 154(b) by 0 days.

(21) Appl. No.: 14/519,963

(22) Filed: Oct. 21, 2014

(51) Int. Cl.
    *B62D 33/033* (2006.01)

(52) U.S. Cl.
    CPC .................................. *B62D 33/033* (2013.01)

(58) Field of Classification Search
    CPC ........................................................ B62D 33/033
    USPC ............................................. 296/32, 37.6, 36
    See application file for complete search history.

(56) References Cited

U.S. PATENT DOCUMENTS

| | | |
|---|---|---|
| 2,984,514 A | 5/1961 | Lemley |
| 4,998,023 A * | 3/1991 | Kitts ..................... B62B 3/02 211/188 |
| 5,299,826 A | 4/1994 | Flowers |
| 6,152,510 A * | 11/2000 | Newsome ............. B62D 33/023 296/10 |
| 7,052,033 B2 | 5/2006 | McDonell |

* cited by examiner

*Primary Examiner* — Joseph D Pape
*Assistant Examiner* — Dana Ivey
(74) *Attorney, Agent, or Firm* — Crossley & Stevenson IP Law

(57) ABSTRACT

A railing kit for a utility cart including two side panels, a front panel, and a rear panel, each panel has a top rail and an identical bottom rail. A first, second, third and fourth notch are disposed on each of a respective panel. Each of the first notches engages a respective one of the fourth notches, and each of the second notches engages a respective one of the third notches. At least one pair of beams are disposed on the top and bottom rails in a position perpendicular thereto. A connecting member is disposed on the lower end of each beam, each connecting member is configured to securingly engage and alternately disengage a utility cart slot. A fifth notch is centrally disposed on the upper end of each beam. The railing kit for a utility cart includes additional accessories configured to engage at least one of the fifth notches.

3 Claims, 7 Drawing Sheets

RAILING KIT FOR A UTILITY CART

BACKGROUND OF THE INVENTION

Various types of wheeled cart railings are known in the prior art. However, what is needed is a railing kit for a utility cart including interchangeable interlocking railings. Current utility carts can only be filled to the top edge without the risk of loosing the contents of the cart. The present device creates an additional barrier and provides an easier work space by separating the cart into desired sections. The additional attachments provide a wider range of options for a user. The interchangeable, interlocking rail system aids in storing and hauling many different items and materials

FIELD OF THE INVENTION

The present invention relates to wheeled cart railings, and more particularly, to a railing kit for a utility cart which includes interchangeable railings.

SUMMARY OF THE INVENTION

The general purpose of the present a railing kit for a utility cart, described subsequently in greater detail, is to provide a railing kit for a utility cart which has many novel features that result in a railing kit for a utility cart which is not anticipated, rendered obvious, suggested, or even implied by prior art, either alone or in combination thereof.

To accomplish this, the present railing kit for a utility cart includes a pair of side panels, a front panel, and a rear panel. Each of the side panels, the front panel and the rear panel have a parallelepiped top rail having a front side, a back side, a top side, a bottom side, a right side, and a left side. A parallelepiped bottom rail identical to the top rail, wherein the bottom rail is disposed parallel to the top rail.

A first notch is disposed on the bottom right side of each of the top and bottom rails of each side panel. A second notch is disposed on the top left side of each of the top and bottom rails of each side panel. A third notch is disposed on each of the bottom right and left sides of the rear panel. A fourth notch is disposed on each of the top right and left sides of the front panel. Each of the first notches engages a respective one of the fourth notches, and each of the second notches engages a respective one of the third notches.

There is at least one pair of equally spaced apart parallelepiped beams disposed on the front side and alternately on the back side of the top and bottom rails in a position perpendicular thereto. Each beam has an upper end attached to the top rail and a lower end attached to the bottom rail. At least one fastener is disposed through each of the beam upper end and the top rail and the beam lower end and bottom rail. Each fastener on each respective beam is configured secure the beam to the top and bottom rail.

A connecting member is disposed on the lower end of each beam, each connecting member is configured to securingly engage and alternately disengage a utility cart slot.

A fifth notch is centrally disposed on the upper end of each beam.

The railing kit for a utility cart also includes at least one small basket body and at least one large cross member basket body, each one of the small basket body and each one of the large cross member basket body are configued to attach to at least one of a fifth notch. Each of the small basket body and each of the large cross member basket body provide additional storage options for the utility cart.

The railing kit for a utility cart also has at least one floor panel configured to removably engage one of a top rail top side and alternately a bottom rail top side.

Thus has been broadly outlined the more important features of the present railing kit for a utility cart so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
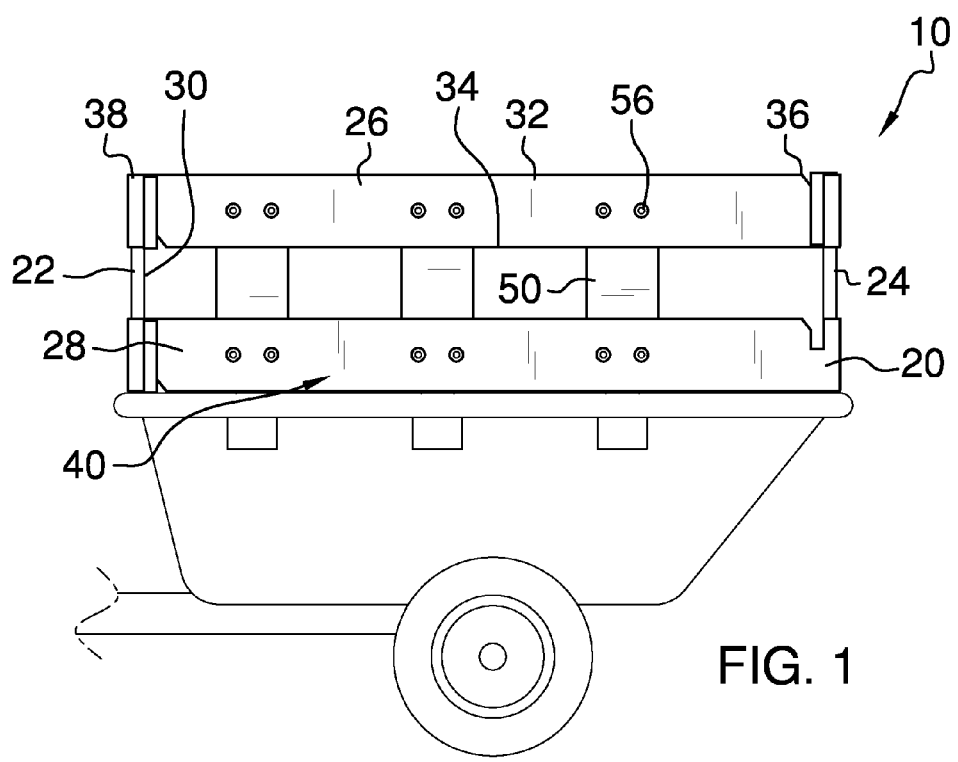
FIG. 1 is an in-use view.
Figure 2:
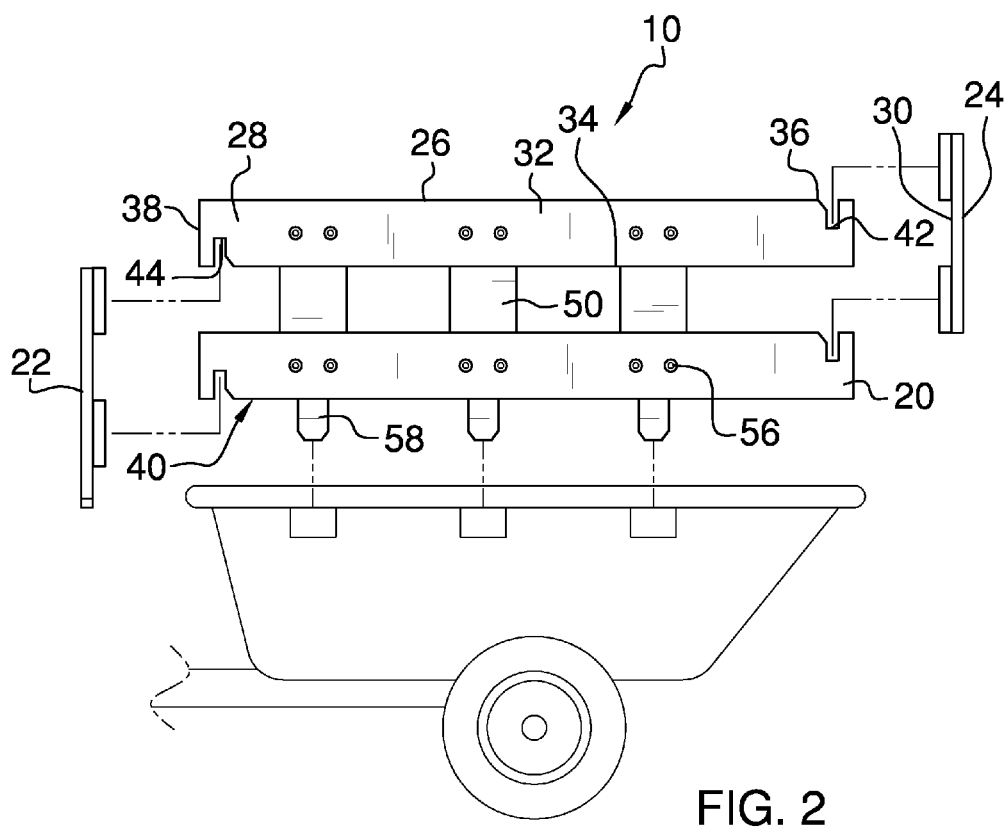
FIG. 2 is an exploded view.
Figure 3:
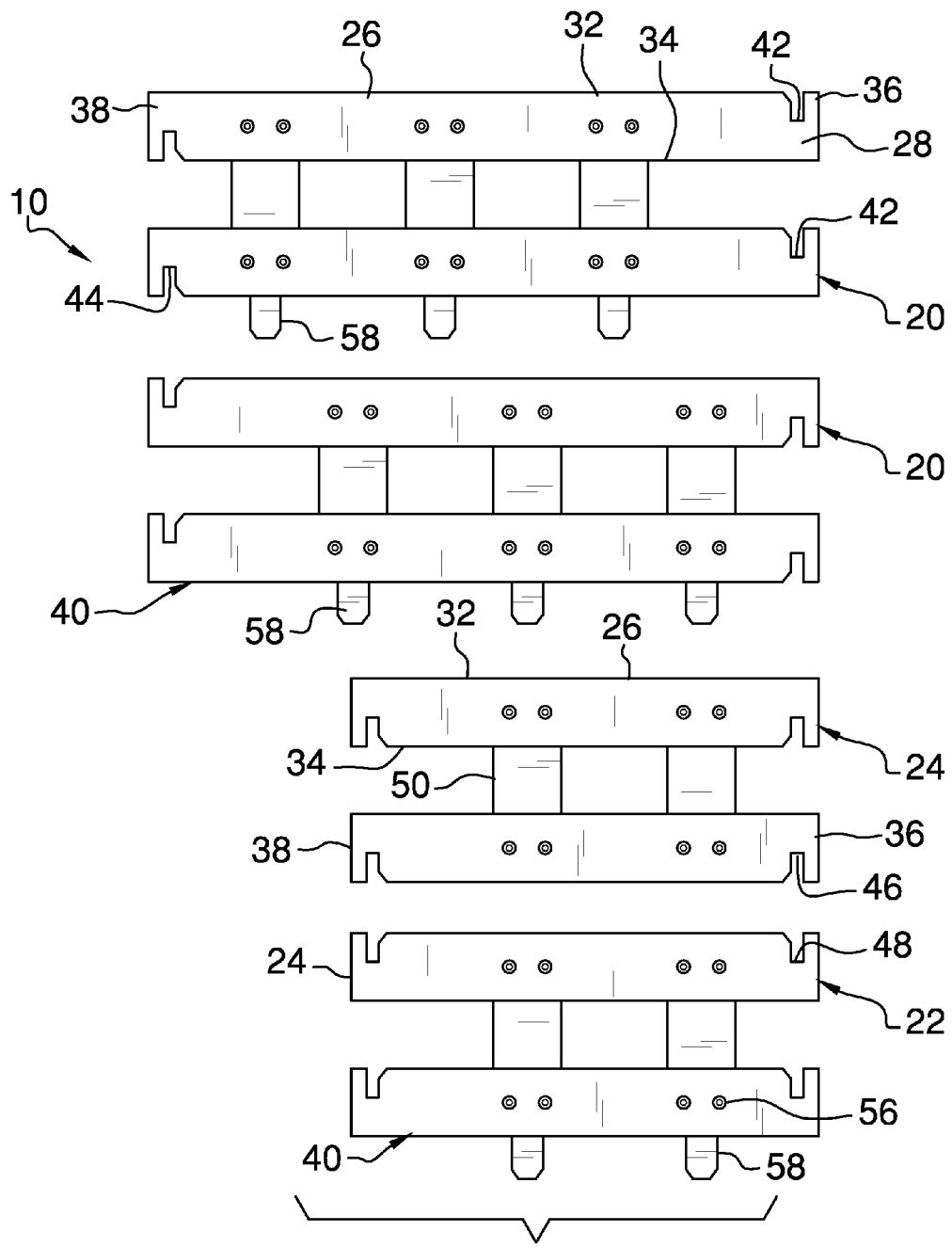
FIG. 3 is a front view of a plurality of panels.
Figure 4:
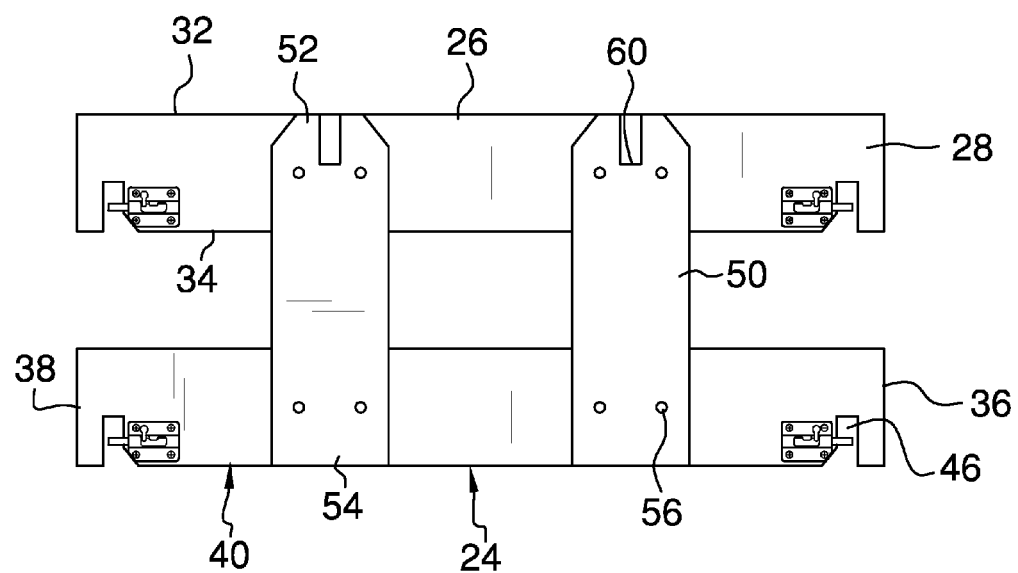
FIG. 4 is a rear view of a back panel.
Figure 5:
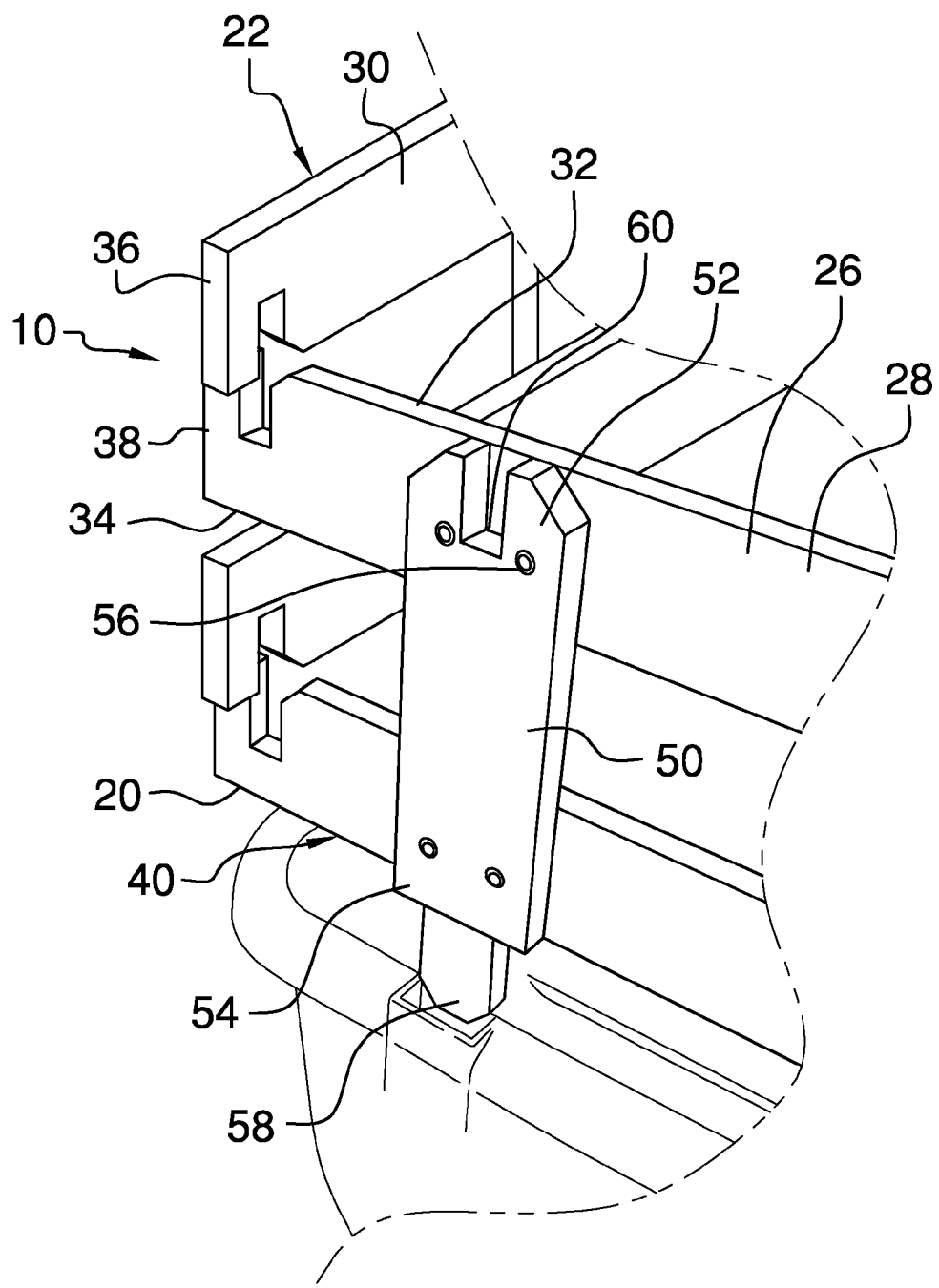
FIG. 5 is a detail view.
Figure 6:
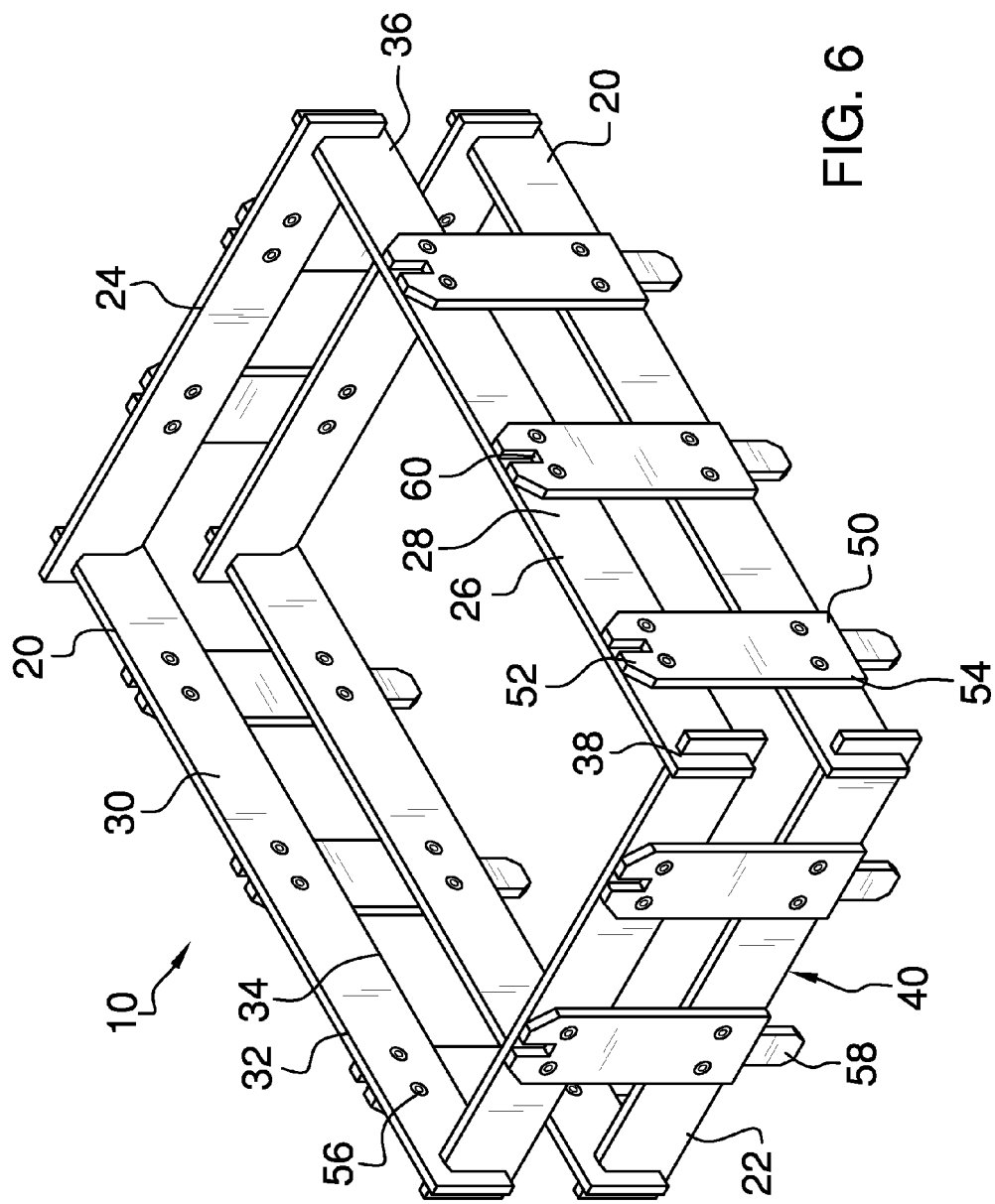
FIG. 6 is an isometric view.
Figure 7:
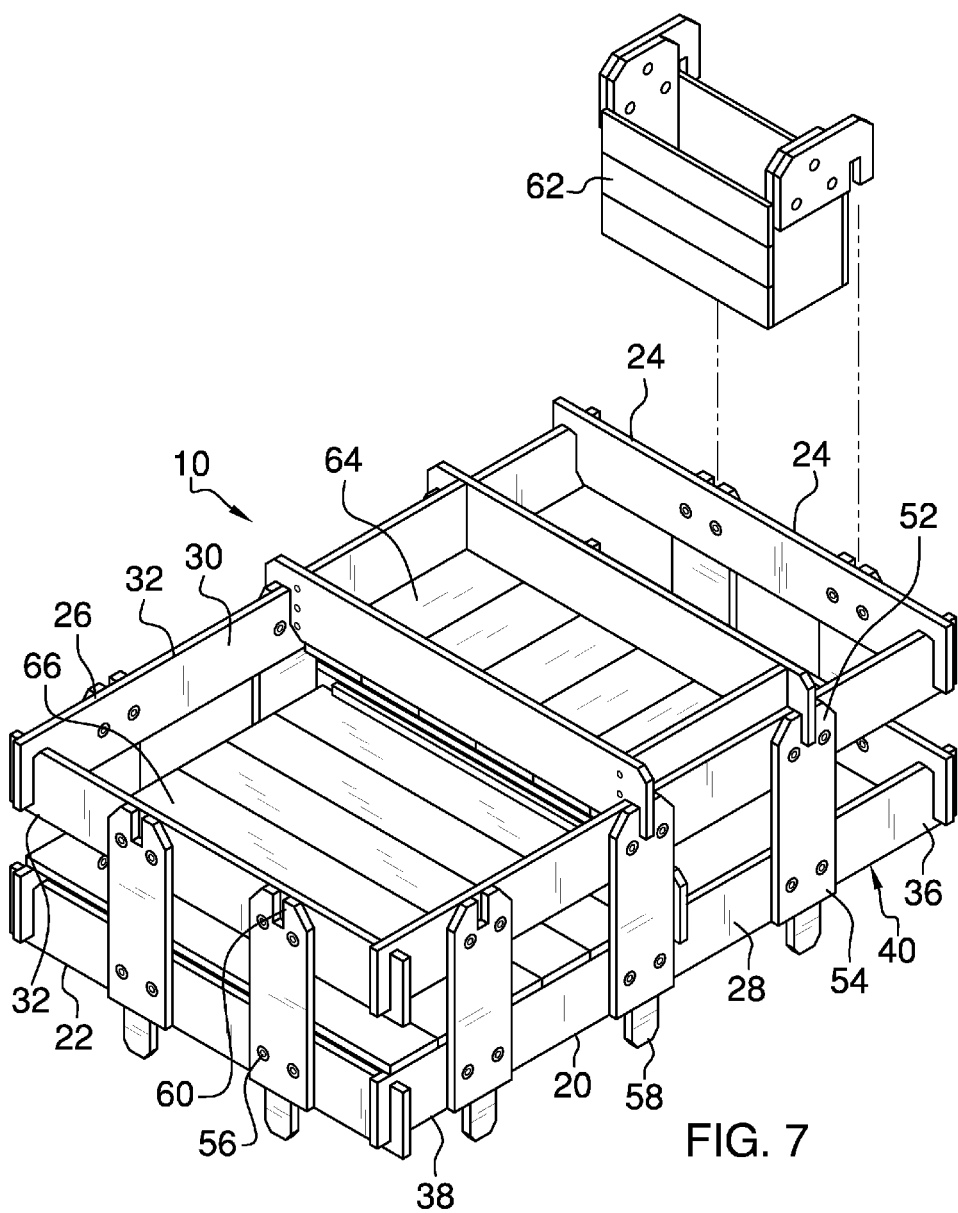
FIG. 7 is an isometric view including additional elements.

With reference now to the drawings, and in particular FIGS. 1 through 7 thereof, an example of the instant railing kit for a utility cart employing the principles and concepts of the present railing kit for a utility cart and generally designated by the reference number 10 will be described.

Referring to FIGS. 1 through 7 the present railing kit for a utility cart 10 is illustrated. The railing kit for a utility cart 10 includes a pair of side panels 20, a front panel 22, and a rear panel 24. Each of the side panels 20, the front panel 22 and the rear panel 22 have a parallelepiped top rail 26 having a front side 28, a back side 30, a top side 32, a bottom side 34, a right side 36, and a left side 38. A parallelepiped bottom rail 40 identical to the top rail 26, wherein the bottom rail 40 is disposed parallel to the top rail 26.

A first notch 42 is disposed on the bottom right side 36 of each of the top and bottom rails 26, 40 of each side panel 20. A second notch 44 is disposed on the top left side 38 of each of the top and bottom rails 26, 40 of each side panel 20. A third notch 46 is disposed on each of the bottom right and left sides 36, 38 of the rear panel 24. A fourth notch 48 is disposed on each of the top right and left sides 36, 38 of the front panel 22. Each of the first notches 42 engages a respective one of the fourth notches 48, and each of the second notches 44 engages a respective one of the third notches 46.

There is at least one pair of equally spaced apart parallelepiped beams 50 disposed on the front side 28 and alternately on the back side 30 of the top and bottom rails 26, 40 in a position perpendicular thereto. Each beam 50 has an upper end 52 attached to the top rail 26 and a lower end 54 attached to the bottom rail 40. At least one fastener 56 is disposed through each of the beam upper end 52 and the top rail 26 and the beam lower end 54 and the bottom rail 40. Each fastener 56 on each respective beam 50 is configured secure the beam 50 to the top and bottom rail 26, 40.

A connecting member 58 is disposed on the lower end 54 of each beam 50, each connecting member 58 is configured to securingly engage and alternately disengage a utility cart slot.

A fifth notch 60 is centrally disposed on the upper end 52 of each beam 50.

The railing kit for a utility cart 10 also includes at least one small basket body 62 and at least one large cross member basket body 64, each one of the small basket body 62 and each one of the large cross member basket body 64 are configured to attach to at least one of a fifth notch 60. Each of the small basket body 62 and each of the large cross member basket body 64 provide additional storage options for the utility cart.

The railing kit for a utility cart 10 also has at least one floor panel 66 configured to removably engage one of a top rail top side 32 and alternately a bottom rail top side 32.

What is claimed is:

1. A railing kit for a utility cart comprising:
a pair of side panels, a front panel, and a rear panel, each of the side panels, the front panel and the rear panel comprising:
   a parallelepiped top rail having a front side, a back side, a top side, a bottom side, a right side, and a left side;
   a parallelepiped bottom rail identical to the top rail, wherein the bottom rail is disposed parallel to the top rail;
   a first notch disposed on the bottom right side of each of the top and bottom rails of each side panel,
   a second notch disposed on the top left side of each of top and bottom rails of each side panel,
   a third notch disposed on each of the bottom right and left sides of the rear panel;
   a fourth notch disposed on each of the top right and left sides of the front panel;
   at least one pair of equally spaced apart parallelepiped beams disposed on the front side and alternately on the back side of the top and bottom rails in a position perpendicular thereto, each beam having an upper end attached to the top rail and a lower end attached to the bottom rail;
   a connecting member disposed on the lower end of each beam, each connecting member configured to securingly engage and alternately disengage a utility cart slot; and
   a fifth notch centrally disposed on the upper end of each beam;
wherein each of the first notches engages a respective one of the fourth notches;
wherein each of the second notches engages a respective one of the third notches;
at least one fastener disposed through each of the beam upper end and the top rail and the beam lower end and bottom rail;
wherein each fastener on each respective beam is configured secure the beam to the top and bottom rail;
a small basket body configured to attach to at least one of a fifth notch.

2. A railing kit for a utility cart comprising:
a pair of side panels, a front panel, and a rear panel, each of the side panels, the front panel and the rear panel comprising:
   a parallelepiped top rail having a front side, a back side, a top side, a bottom side, a right side, and a left side;
   a parallelepiped bottom rail identical to the top rail, wherein the bottom rail is disposed parallel to the top rail;
   a first notch disposed on the bottom right side of each of the top and bottom rails of each side panel,
   a second notch disposed on the top left side of each of top and bottom rails of each side panel,
   a third notch disposed on each of the bottom right and left sides of the rear panel;
   a fourth notch disposed on each of the top right and left sides of the front panel;
   at least one pair of equally spaced apart parallelepiped beams disposed on the front side and alternately on the back side of the top and bottom rails in a position perpendicular thereto, each beam having an upper end attached to the top rail and a lower end attached to the bottom rail;
   a connecting member disposed on the lower end of each beam, each connecting member configured to securingly engage and alternately disengage a utility cart slot; and
   a fifth notch centrally disposed on the upper end of each beam;
wherein each of the first notches engages a respective one of the fourth notches;
wherein each of the second notches engages a respective one of the third notches;
at least one fastener disposed through each of the beam upper end and the top rail and the beam lower end and bottom rail;
wherein each fastener on each respective beam is configured secure the beam to the top and bottom rail;
a large cross member basket body configured to attach to at least one of a fifth notch.

3. A railing kit for a utility cart comprising:
a pair of side panels, a front panel, and a rear panel, each of the side panels, the front panel and the rear panel comprising:
   a parallelepiped top rail having a front side, a back side, a top side, a bottom side, a right side, and a left side;
   a parallelepiped bottom rail identical to the top rail, wherein the bottom rail is disposed parallel to the top rail;
   a first notch disposed on the bottom right side of each of the top and bottom rails of each side panel,
   a second notch disposed on the top left side of each of top and bottom rails of each side panel,
   a third notch disposed on each of the bottom right and left sides of the rear panel;
   a fourth notch disposed on each of the top right and left sides of the front panel;
wherein each of the first notches engages a respective one of the fourth notches; and
wherein each of the second notches engages a respective one of the third notches;
   at least one pair of equally spaced apart parallelepiped beams disposed on the front side and alternately on the back side of the top and bottom rails in a position perpendicular thereto, each beam having an upper end attached to the top rail and a lower end attached to the bottom rail;
   a connecting member disposed on the lower end of each beam, each connecting member configured to securingly engage and alternately disengage a utility cart slot;
   a fifth notch centrally disposed on the upper end of each beam;
at least one fastener disposed through each of the beam upper end and the top rail and the beam lower end and bottom rail;
wherein each fastener on each respective beam is configured secure the beam to the top and bottom rail;
a small basket body configured to attach to at least one of a fifth notch;
a large cross member basket body configured to attach to at least one of a fifth notch; and
a floor panel configured to removably engage one of a top rail top side and alternately a bottom rail top side.

* * * * *